May 27, 1924.

G. M. LUDLOW 1,495,337

SCALE TRANSLATING DEVICE

Filed Feb. 17, 1922

Witness:—
J. L. Brown

Inventor:—
George M. Ludlow,
By Wilkinson, Huxley, Byron & Knight
Attys.

Patented May 27, 1924.

1,495,337

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

SCALE-TRANSLATING DEVICE.

Application filed February 17, 1922. Serial No. 537,314.

*To all whom it may concern:*

Be it known that I, GEORGE M. LUDLOW, a citizen of the United States, residing at Evanston, in the county of Cook and State of Illinois, have invented certain new and useful Improvements in Scale-Translating Devices, of which the following is a specification.

This invention relates to scales of the type in which movement of the weighing mechanism is translated into rotary movement of a cylindrical chart which gives the readings of the scale's work.

One object of the invention is to provide an improved construction of revolving chart scale that will permit the chart to be moved into and out of driven relation with the translating device, or the driving member thereof, without dismounting the latter, and thus permit the chart to be conveniently removed and replaced without disarranging adjustments of mechanism, upon the correct assembly of which the accuracy of the scale largely depends, and to permit such removal and replacement even though the chart embodies two cylinders mounted upon a single continuous shaft and receives its drive from translating mechanism located between the cylinders. Accordingly, one feature of the invention consists in mounting the chart and its shaft for bodily movement laterally into and out of driven relation with the driving member of the translating device, and providing an opening in the scale housing through which the chart may be passed by such lateral movement, a feature incident to the preferred embodiment of this part of the invention consisting in having the counterbalancing element, which is located between the movable wall and the chart shaft, mounted in a manner that permits of ready detachment and reattachment to members with which it is connected, and by which its resistance is calibrated without destroying adjustments.

Another object is to convert the reciprocating motion of the weighing mechanism into rotary motion by means independent of the chart and its shaft, and from which the chart and shaft are separable, as aforesaid; and, accordingly, another feature of the invention consists in establishing the laterally separable driving connection between the translating device and the chart shaft through the medium of gear wheels, one of which is carried by the rotary member of the translating device and the other of which is carried by the shaft.

Still another object is to realize the objects aforesaid in an organization in which the reciprocating motion of the weighing mechanism is converted into rotary motion to be transmitted to the chart, by translating mechanism of the type which employs a rotary driving member which revolves the chart through the full circumferential distance of its throw with less than a complete revolution of the driving member; and, accordingly, still another feature of the invention consists in embodying in the translating mechanism multiplying gear wheels, of which the smaller or driven member is on the chart shaft, and the larger is on the opposite side of the chart shaft from the opening in the casing through which the chart is removed.

In order that the invention may be fully understood, the preferred embodiment thereof is shown in the accompanying drawings.

In said drawings—

Figure 1:
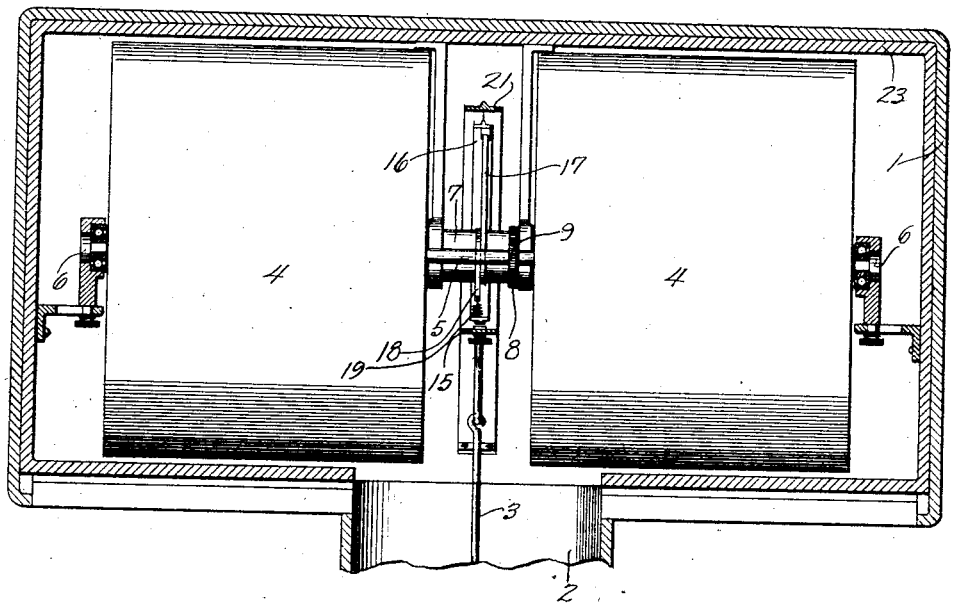
Figure 1 is a front elevation of the registering portion of a scale together with the translating mechanism associated therewith, the scale housing and some of the mountings being shown in section to disclose interior parts thereof.
Figure 2:
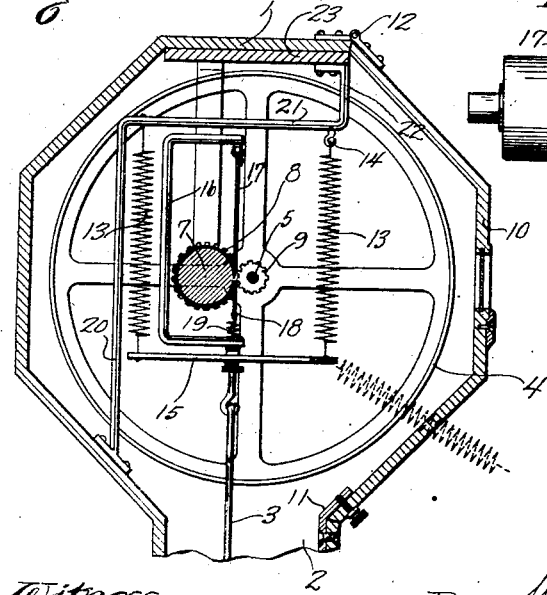
Figure 2 is a transverse section of the same portion of the scale, in a plane to the left of the translating device as viewed in Figure 1.
Figure 4:
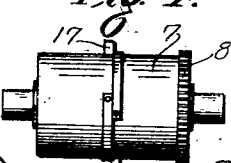
Figure 4 is a detail view of the barrel of the translating device.
Figure 3:
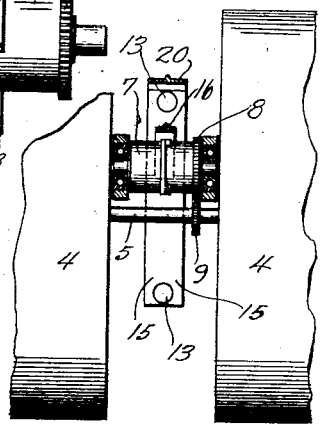
Figure 3 is a detail view showing in plan portions of the two cylinders which make up the chart, together with the portion of the translating device by which it is driven, bearings and mountings of the translating device being shown in section.

1 represents the chart housing, for instance, the head of a T-shaped casing, and 2 the column by which such a casing is usually supported from the base of the scale. 3 represents a steelyard rod which rises from the loading mechanism of the scale and transmits vertically reciprocating movements therefrom which, by the mechanism of the present invention, are to be translated into rotary movements of a chart by which the work of the scale is read. 4, 4 represent two cylindrical units which constitute the chart and which are mounted upon a common shaft 5 supported at its ends in bearings 6 and receiving its rotary movements from the barrel 7 of translating mechanism which is located between the cylinders 4.

Barrel 7 drives the shaft 5 through the medium of a gear wheel 8 upon the barrel and a gear wheel 9 upon the shaft. Housing 1 has a portion 10 of its lateral wall, corresponding in dimensions to at least the transverse dimensions of the chart, made conveniently removable, as, for instance, by releasably securing it at 11 and hinging it or otherwise bringing it into movable bearing upon the rest of the housing at 12, and the gear wheel 9 of the chart shaft is located on the side of the gear wheel 8 of the barrel, which is toward this movable wall of the housing, while any parts of the translating mechanism which would obstruct lateral movement of the chart shaft away from the translating device are on the opposite side of the pinion 9 from the opening wall 10 so that if it becomes desirable to remove the chart 4 and replace it with another chart, this can be conveniently done without disarranging parts of the scale, the proper and accurate assembly of which is necessary to its correct operation.

13 represents counterbalancing springs which are preferably located in the vicinity of the translating device and between the cylinders, and one of these springs 13 may be arranged between the pinion 9 and the movable side wall 10, but it is made readily releasable from the path of the chart shaft, as, for instance, by having one of its ends releasably engaged over the hoop 14 so that the spring can be lowered into the dotted line position when it is desired to remove and replace the chart.

In order that the reciprocating motion of the steelyard rod 3 may be converted into rotary motion independently of the pinion 9 on the chart shaft, the present invention mounts the barrel 7, which constitutes an element of the translating device, independently of the chart shaft 5, so that the adjustment, ratio of drive, and other fixed relationships in the parts which convert reciprocating motion of the steelyard rod 3 into rotary motion to be imparted to the chart need not be disturbed in the removal of the chart; and all that is necessary in replacing a chart is to locate the zero line at the proper point as the gear wheel 9 approaches the gear wheel 8, or sufficiently near to the proper position to permit the chart to be zeroized by the zeroizing adjustments to be described.

Counterbalance springs 13 are connected to the steelyard rod 3 through the medium of the usual yoke 15. In order that reciprocating motion of steelyard rod 3 may be converted into rotary motion of the independently mounted barrel 7, yoke 15 is made to carry a bow 16 which projects on opposite sides of a vertical diameter of the barrel 7 and receives the straight ends of a pair of tapes 17, 18 which are wound upon the barrel 7, each a distance corresponding at least to the degree of rotation to be imparted to the barrel. In order that the tapes 17, 18 can be wound upon the barrel 7 in planes normal to its axis of revolution without lapping, or, in other words, wound upon less than a complete circumference of the barrel, the gear wheel 8 is made sufficiently larger than the gear wheel 9 on the chart shaft 5 which it drives to insure complete revolution of the chart from a partial revolution of the barrel.

Preferably one of the tapes, for instance, tape 18, is connected with the bow 16 through the medium of a spring 19 for the purpose of keeping the tapes taut. The counterbalance springs 13 may be supported in any desired manner that does not involve obstruction to the removal of the chart. In the present embodiment, this is accomplished through an open sided frame, the vertical leg 20 of which is on the side of the chart shaft opposite to the movable housing wall 10, while the horizontal supporting arm 21 extends forward therefrom a distance sufficient to receive the springs and may, if desired, receive further vertical support through the hanging end 22 attached to the cross plate 23 of the housing.

I claim:

1. In a scale, a housing, a motion translating member in said housing; and a rotary chart mounted in said housing; said housing having a movable wall of dimensions permitting movement of the chart laterally therethrough; and said chart having a driven member movable laterally into and out of driven relation with said translating member.

2. In a scale, a housing, a rotary chart removably mounted in said housing and comprising a continuous shaft and a pair of units spaced apart upon said shaft, a translating mechanism mounted in said housing between the units of said shaft, and a driving connection between the translating device and the shaft, separable by movement transverse to the axis of the shaft; said housing having a removable wall in position to pass the chart by continuation of said transverse movement.

3. In a scale, a chart having a shaft through which it is mounted to rotate, a housing in which said shaft is mounted having a movable wall corresponding in position to a side of the chart, and a translating device constructed to convert reciprocating into rotary motion independently of said chart, located on the opposite side of the chart shaft from said movable wall.

4. In a scale, a chart having a shaft through which it is mounted to rotate, a housing having a movable wall corresponding in position to a side of said chart and permitting passage of the chart to and from the housing, and means mounted independently of said chart imparting rotation thereto and located on the opposite side of said shaft from said movable housing wall.

5. In a scale, a chart, a shaft upon which said chart is mounted to rotate, a housing having a movable wall located to permit the removal of the chart laterally from the housing, a translating member mounted independently of the chart shaft for imparting rotation thereto, located on the opposite side of said shaft from said movable housing wall, counterbalancing means located adjacent to said translating member, and a support for said counterbalancing means open between said shaft and said movable wall.

6. In a scale, a chart, a shaft upon which said chart is mounted for rotation, a housing enclosing said chart and having a movable wall permitting the chart to pass laterally into and out of the housing, a translating member having separable driving connection with said shaft, counterbalancing means adjacent said translating member and imparting movement thereto in one direction, and a support for said counterbalancing means comprising an upstanding member located on the side of the shaft opposite to said movable wall and having a portion extending toward said movable wall to support the counterbalancing means.

7. In a scale, a housing, a chart mounted in said housing, a rotary driving member mounted independently of said chart and having driving connection therewith, said housing having a movable wall that is opposed to a side of said chart and is adapted to provide an opening through which said chart may be removed and replaced, and means independent of and out of the path through which said chart is removed and replaced, coacting with said driving member to develop rotary motion therein.

8. In a scale, a housing, a translating mechanism in said housing comprising a driving gear wheel and a reciprocatory member developing rotary motion therein, a rotary chart removably and replaceably mounted in said housing, and a driven gear wheel carried by said chart movable into and out of mesh with said driving gear wheel by replacement and removal of the housing; said housing having a wall that is opposed to a side of said chart movable to provide an opening that is adapted to pass the chart into and out of the housing.

9. In a scale, a loading member, a driving pinion, bearings supporting said driving pinion in determined relation to said loading member, means translating reciprocating movement of said loading member into rotary movement of said driving pinion, a rotary cylindrical chart having a shaft, a driven pinion on said shaft adapted to move into and out of mesh with said driving pinion, bearings for said chart permitting removal and replacement of the chart in a path transverse to the axis of the chart, and a housing enclosing the chart and pinions, having a wall that is opposed to a side of said chart on the side of the driven pinion that is away from the driving pinion, and movable and adapted to provide an opening that will pass said chart to and from the housing.

10. In a scale, a loading member, a rotary cylindrical chart, a housing enclosing said chart having a wall that is opposed to a side of said chart, said wall being movable and adapted to provide an opening through which the chart may pass, a motion translating device connecting said loading member and chart from which the chart is separable by movement toward said opening, and a counterbalancing member located between a portion of said chart and said opening, having connections which permit it to be released and moved out of the path of said portion of the chart and restored to counterbalancing relation at will.

Signed at Chicago, Illinois, this 8th day of February, 1922.

GEORGE M. LUDLOW.